No. 11,704. Reissued Nov. 29, 1898.

B. F. HAUGH & G. H. VINCETT.

KNUCKLE FOR CAR COUPLINGS.

(Application filed Nov. 5, 1898.)

WITNESSES

C. S. Prye.

J. A. Walsh.

INVENTORS

Benjamin F. Haugh and George H. Vincett,

BY

Chester Bradford,

ATTORNEY.

UNITED STATES PATENT OFFICE.

BENJAMIN F. HAUGH, OF INDIANAPOLIS, AND GEORGE H. VINCETT, OF ANDERSON, INDIANA; SAID VINCETT ASSIGNOR TO SAID HAUGH.

KNUCKLE FOR CAR-COUPLINGS.

SPECIFICATION forming part of Reissued Letters Patent No. 11,704, dated November 29, 1898.

Original No. 586,183, dated July 13, 1897. Application for reissue filed November 5, 1898. Serial No. 695,642.

*To all whom it may concern:*

Be it known that we, BENJAMIN F. HAUGH, residing at Indianapolis, in the county of Marion, and GEORGE H. VINCETT, residing at Anderson, in the county of Madison, State of Indiana, citizens of the United States, have invented new and useful Improvements in Knuckles for Car-Couplers, of which the following is a specification.

The object of our said invention is to render the contacting surfaces of those parts in automatic car-couplers commonly called "knuckles" more durable, so that the life of such knuckles shall be prolonged. This object is accomplished by inserting in the faces of the knuckles at the contacting or wearing points pieces of self-hardening steel (hereinafter denominated "resistance-strips") of suitable dimensions, which when in place constitute the principal portions of such contacting or wearing surfaces, whereby they are enabled to offer a greater resistance to abrasion when the knuckles are engaged or interlocked in service, as will be hereinafter more particularly described and claimed.

Figure 1:
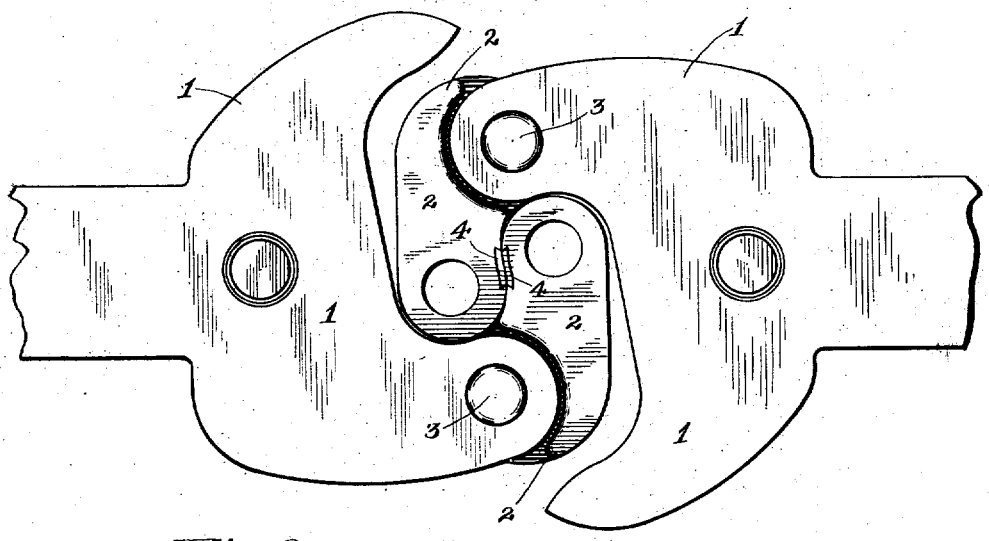
Figure 2:
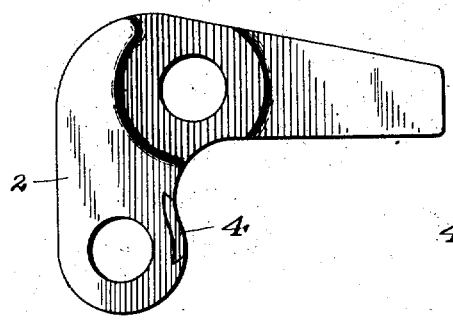
Figure 3:
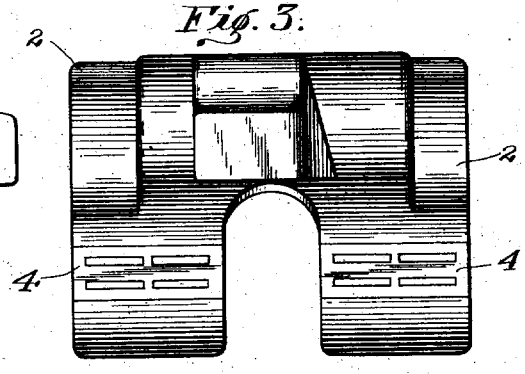
Figure 4:
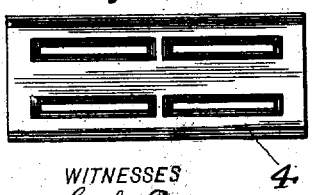
Figure 5:
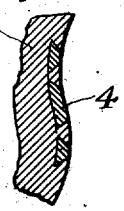
Figure 6:
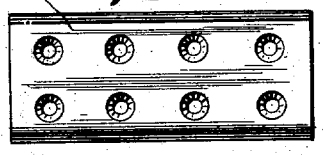
Figure 7:
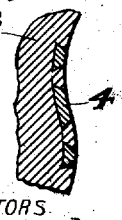

Referring to the accompanying drawings, which are made a part hereof and on which similar reference characters indicate similar parts, Figure 1 is a plan view of the draw-bar heads and the engaging portions of the two parts of an automatic car-coupler, the knuckles whereof are provided with resistance-strips embodying our invention; Fig. 2, a detail plan view of one of the knuckles of the coupler separately; Fig. 3, a detail elevation of the same, showing the face which is provided with such resistance-strips; Fig. 4, an elevation of one of said resistance-strips separately; Fig. 5, a transverse sectional view of the same with a fragment of the knuckle-body in which it is inserted; Fig. 6, a view similar to Fig. 4, showing an alternative form of resistance-strips; and Fig. 7, a sectional view thereof similar to Fig. 5.

The car-coupling may, generally speaking, be of any form desired, as our invention is applicable to any of the well-known or standard forms of automatic couplers in general use, and we have exhibited our invention as applied to a widely-used form.

In such couplers the knuckles 2, to which our invention is applied, are attached to the draw-bar heads 1 by means of pivots or pins 3. These knuckles are not changed in form or operation in any way because of our invention, and the contours of their engaging or contacting surfaces remain the same as where our invention is not employed, as neither the form of the knuckle nor of the draw-bar head constitutes any part of our present invention, which consists wholly in the application of the hard metallic strips 4 to the contacting surfaces of said knuckles, as hereinafter described.

The insertion of hardened resistance-strips in the contacting surfaces of car-coupler knuckles after the knuckles themselves have been formed is undesirable, for the reasons that it is difficult to secure such strips strongly enough in place to sustain the hard usage to which such parts are subjected in use without becoming displaced, and the labor required in uniting the parts in this way is too great and the expense of doing it too much to justify its adoption, while such cutting reduces the size of the solid structure of the knuckle, thus impairing its strength. In our invention we cast the strip of hard metal in place at the same time the knuckle itself is formed.

Knuckles of the kind shown are now preferably made of steel cast by the "open-hearth" process, which is low in carbon and consequently is comparatively soft, but which is otherwise strong and of great durability. The resistance-strips, on the other hand, should be higher in carbon, and thus capable of a greater hardness, with consequent better wearing qualities under abrasion. It is necessary also that such strips should have a hard temper, and common qualities of hard cast-steel would have the temper drawn by the contact therewith of the hot metal of which the knuckles are cast during the process of casting said knuckles. To temper such strips or surfaces by reheating and hardening after the knuckles are formed has the effect of causing a strain upon the structure of the knuckle, which is apt to cause it to break either immediately or shortly after being put in use, and therefore the mere inserting of a piece of steel high in carbon into the face of the knuckle while casting the latter does not properly meet the requirements of the case. Much experiment and study were required for the solution of the problem thus presented, which was finally accomplished by the employment of a self-hardening steel for these strips. Such a material is produced by mixing and compounding with the steel, preferably when in a molten state, an ingredient such as tungsten, manganese, nickel, chromium, &c., any one of which imparts to the steel with which it is compounded the faculty of self-hardening or returning to a hard state when permitted to cool in the natural way, and this irrespective of the number of times the compound may be heated and permitted to cool. It also retains its toughness, which for this use is very important.

We have shown the edges of our resistance-strips as beveled or dovetailed in form, and have shown as a further means of securing the strips to the knuckles longitudinal slots (shown most plainly in Fig. 4) or countersunk holes (shown most plainly in Fig. 6) in said strips, which taper outwardly at their edges and into which the metal of the knuckles will flow in casting, thus forming dovetailed center grips or anchors.

In carrying out our invention we set the strips formed of the desired material in proper position in the molds wherein the knuckles are to be cast, and the fluid metal which forms the latter will flow around said strips, thus securing them firmly in place. The metal of which the bodies of the knuckles are formed, being, as above explained, low in carbon, requires a very high heat to melt it, while the steel of the resistance-strips being high in carbon is fusible at a less heat. The consequence is that when the very highly-heated metal of which the knuckles are formed comes in contact with the surface of the metal of the resistance-strips or contact-pieces the latter become fused at the point of union, with the result that in each case the two parts are strongly welded together into a practically homogeneous mass. It may thus be said that the described formation of these resistance-strips including countersunk slits or holes is unnecessary, although we prefer to provide such slits or holes for greater certainty and security.

Having thus fully described our said invention, what we claim as new, and desire to secure by Letters Patent, is—

1. A coupling-knuckle for car-couplers, having a hardened metallic resistance-strip cast in place in its bearing or coupling surface and flush with the said surface.

2. A coupling-knuckle for car-couplers, having a resistance-strip of a self-hardening material cast in place in its bearing or coupling surface and flush with the said surface.

3. A coupling-knuckle for car-couplers, provided with a resistance-strip of hard material formed with longitudinally-extending dovetail edges, and a series of countersunk holes distributed over the surface of said strip, substantially as and for the purpose set forth.

In witness whereof we have hereunto set our hands and seals, at Indianapolis, Indiana, this 27th day of October, 1898.

BENJAMIN F. HAUGH. [L. S.]
GEORGE H. VINCETT. [L. S.]

Witnesses:
CHESTER BRADFORD,
JAMES A. WALSH.